(12) United States Patent
Knubben et al.

(10) Patent No.: US 9,137,019 B2
(45) Date of Patent: Sep. 15, 2015

(54) SECURE WIRELESS CHARGING

(71) Applicant: NXP B.V., Eindhoven (NL)

(72) Inventors: Wihelmus H. C. Knubben, Susteren (NL); Klaas Brink, Waalre (NL); Aliaksei Vladimirovich Sedzin, Eindhoven (NL); Johannes Petrus Maria van Lammeren, Beuningen (NL)

(73) Assignee: NXP, B.V., Eindhoven (NL)

( * ) Notice: Subject to any disclaimer, the term of this patent is extended or adjusted under 35 U.S.C. 154(b) by 0 days.

(21) Appl. No.: 13/735,316

(22) Filed: Jan. 7, 2013

(65) Prior Publication Data

US 2014/0195803 A1  Jul. 10, 2014

(51) Int. Cl.
*H04L 12/14* (2006.01)
*H04L 9/32* (2006.01)
*H02J 7/02* (2006.01)
*H04L 13/18* (2006.01)
*H02J 7/00* (2006.01)
*H04B 5/00* (2006.01)

(52) U.S. Cl.
CPC . *H04L 9/32* (2013.01); *H02J 7/025* (2013.01); *H02J 2007/0001* (2013.01); *H04B 5/0037* (2013.01); *H04L 2209/80* (2013.01)

(58) Field of Classification Search
CPC ....... H04W 4/24; H04W 4/185; H04W 4/025; H04W 28/021; H04M 2001/0204
See application file for complete search history.

(56) References Cited

U.S. PATENT DOCUMENTS

| | | | |
|---|---|---|---|
| 6,429,622 B1 * | 8/2002 | Svensson | 320/106 |
| 7,834,742 B2 | 11/2010 | Amtmann | |
| 8,212,518 B2 | 7/2012 | Pijnenburg et al. | |
| 8,238,823 B2 | 8/2012 | Maugars et al. | |
| 8,723,642 B2 * | 5/2014 | Park et al. | 340/5.8 |
| 2005/0182674 A1 * | 8/2005 | Yeo | 705/13 |
| 2009/0206165 A1 | 8/2009 | Laackmann et al. | |
| 2010/0073143 A1 | 3/2010 | Schaffler | |
| 2011/0136550 A1 | 6/2011 | Maugars | |
| 2011/0193417 A1 | 8/2011 | Hirasaka et al. | |
| 2011/0221391 A1 | 9/2011 | Won et al. | |
| 2012/0220229 A1 * | 8/2012 | Cheon et al. | 455/41.1 |

FOREIGN PATENT DOCUMENTS

WO   2011/044543 A2   4/2011

OTHER PUBLICATIONS

Multiple receiver support for magnetic resonance based wireless charging. Rajagopal et al.IEEE(2011).*
Wireless Power for Mobile Devices. Waffenschmidt, Eberhard. IEEE(2011).*
A new arechitecture of trading platform based on cloud computing. Zhang et al.IEEE(2010).*

(Continued)

*Primary Examiner* — Venkat Perungavoor

(57) ABSTRACT

A wireless charging apparatus and method utilizing a secure element is disclosed. Illustratively, a receiver containing a secure element securely communicates with a charging pad also equipped with a secure element. The communication can be used to establish the identity of the receiver and facilitate billing for the wireless charging. The charging pad may further communicate in a secure manner with a server to authenticate the identity and other information about the receiver before providing wireless charging. Direct communication between the receiver and server is also contemplated.

11 Claims, 2 Drawing Sheets

(56) References Cited

OTHER PUBLICATIONS

WO2007004582 English Translation. WIPO(2007).*
A Secure Application Invocation Mechanism in Mobile Phones for Near Field Communication. Choi et al. IEEE(2012).*
NFC-enabled Wireless Charging. Strommer et al. International Workshop on Near Field Communication(2012).*
Can Nokia take wireless charging mainstream. Adrian Kingsley-Hughes. ZDNet Mobility(Sep. 6, 2012).*
"Qi System Description Wireless Power Transfer—vol. 1: Low Power, Part 1: Interface Definition, Version 1.1.1"; 130 pages. (Jul. 2012).
Strommer, Esko, et al; "NFC-Enabled Wireless Charging"; 2012 $4^{th}$ Intl Workshop on Near Field Communication; IEEE Computer Society; 6 pages (2012).
"GBI Research Report—Wireless Charging Market to 2016—Stnadardization to Increase Uptake and Drive Growth"; 49 pages (Feb. 2012).
Extended European Search Report for Application No. 13199583.9 (Nov. 3, 2014).

* cited by examiner

SECURE WIRELESS CHARGING

FIELD OF THE INVENTION

In general, this invention relates to methods and apparatus for wireless charging. More particularly, it relates to methods and apparatus for wireless charging that include secure communication between receiver and charging pad and/or a server or back office

BACKGROUND OF THE INVENTION

Many equipments or devices, including, for example, mobile phones and electronic equipments, to name but a few, contain rechargeable batteries. An increasingly popular method of recharging such rechargeable batteries is wireless charging. One example of wireless charging is provided by U.S. Pat. No. 8,212,518. It is common to refer to the charging apparatus as the "transmitter" or "charging pad" or "pad" and to the device or equipment being charged as the "receiver"

SUMMARY OF THE INVENTION

An illustrative embodiment of the present invention includes a receiver adapted to receive wireless charging from a pad having a coil for receiving the wireless charging energy and a secure element for providing encrypted information to the pad. Further embodiments include a communication chip for transmitting the encrypted information.

Other embodiments include a charging pad adapted to receive encrypted information from a receiver and having a coil for charging the receiver and a secure element for decrypting the encrypted information. Further embodiments include a communications chip for transmitting information to the receiver.

Other embodiment include a method of charging a receiver which includes the steps of providing a receiver to a charging pad which has a secure element which provides encrypted information to the charging pad. Such method may also include having the charging pad provide all or part of the encrypted information to a server. The server may be a cloud server. In another embodiment, the server may authenticate the encrypted information and then provide confirmation of the authentication to the charging pad. In a further embodiment, the charging pad may subsequently provide charging to the receiver.

Further embodiments include a method of operating a cloud server to receive and decrypt information provided by a charging pad, which information is provided to a charging pad in encrypted form by a receiver. Further embodiments may include causing the cloud server to reply to the charging pad in an encrypted manner with the reply causing the charging pad to initiate charging of the receiver.

Yet another embodiment includes a method of charging a receiver which includes providing a charging pad which, upon proximate present of a receiver, engages in secure communication with the receiver. The charging pad subsequently transmits the secure communication to a server which performs an authentication procedure and then transmits the results of said authentication procedure to the charging pad, causing the charging pad to provide charging to the receiver. In a further embodiment, if there is no communication between the charging pad and the receiver, the receiver may communicate securely with the server using secure elements. The server may provide a charging signal to the receiver and the receiver may relay this signal to the charging pad which then commences charging. Yet further embodiments contemplated include having the receiver store information regarding payment internally. When the receiver is provided to the pad, the receiver transmits information to the charging pad concerning payment and the charging pad commences charging.

Before or after charging is performed, some form of payment or deduction of points or miles may be received from the receiver or owner of the receiver or another entity.

DETAILED DESCRIPTION OF EXEMPLARY EMBODIMENTS

As wireless charging becomes more popular, there may arise a need to provide facilities for wireless charging of receivers in public places. For example, airports and coffee shops may wish to provide wireless charging for their customers. Shopping malls and other places of business may wish to provide wireless charging for electric automobiles.

Under various circumstances it may be desirable for the provider to charge money for the charging service(s) or for the provider to maintain a record of the charging transaction (i.e. to whom the service was provided, the amount of power transferred, etc.). Wireless charging may be offered to customers as part of a customer loyalty program or may require some sort of immediate payment.

Thus, it is desired that receivers be equipped for charging via pads that communicate with such receivers in a secure manner. It is also desired that such pads be equipped with secure communication and verification capabilities.

Communication between the receiver and the pad may be accomplished via a variety of methods, such as: NFC, Bluetooth, or data modulation on the power carrier (e.g. ASK, FSK, PSK, etc.). For example, the pad may be equipped with an NFC tag which receives a signal from the receiver indicating that the receiver is nearby and in need of charging and indicating further the type of receiver, etc. Alternatively, two-way peer to peer NFC communication may be used. Alternatively, the pad may transmit a low power signal to the receiver; the receiver may harvest some of the incoming power to respond by providing a modulated signal on the same carrier frequency indicating that it needs charging, thereby directing the pad to provide charging energy to the receiver.

Whatever communication method is selected, it may be utilized to provide secure encrypted communication between receiver and pad so that identification of the registered owner of the receiver, identification of various characteristics of the receiver (such as the standard or procedures by which the receiver must be charged), and data related to payment (such as account numbers, crediting or debiting of accounts, or addition or subtraction of loyalty points or miles) may be transmitted between receiver and pad.

The pad may be connected to a server, illustratively a cloud server which may serve to validate payment transactions, or to update public key infrastructure administration or to update loyalty databases (possibly maintained at the pad).

Figure 1:
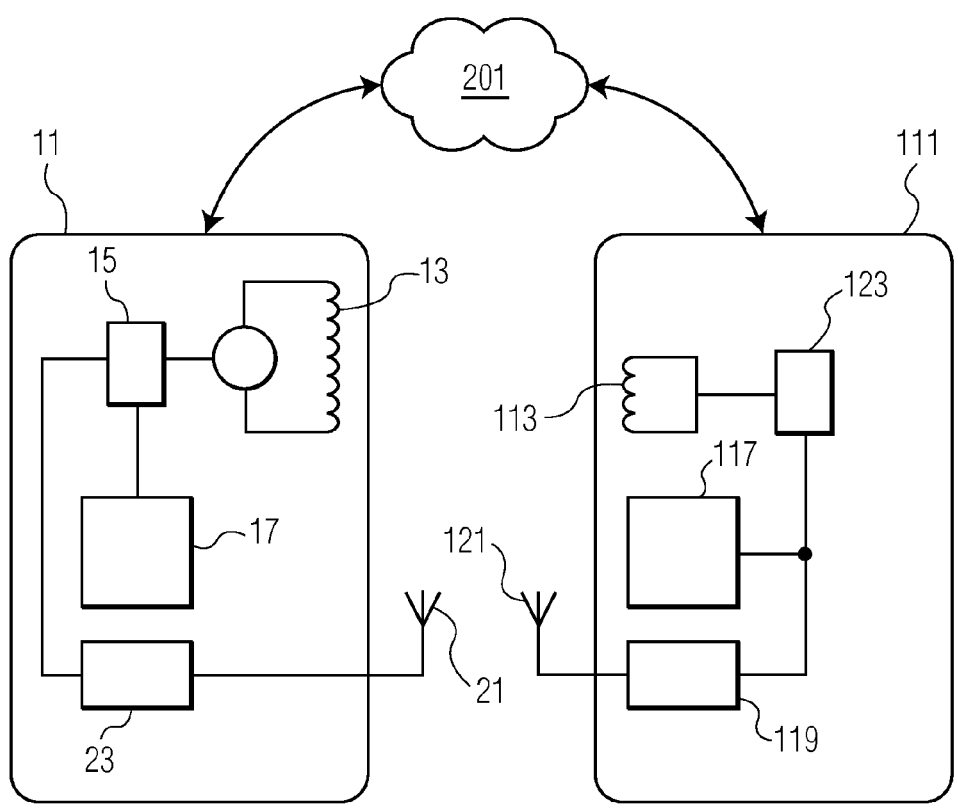
FIG. 1 is a block diagram showing an illustrative embodiment of the present invention.

FIG. 1 shows an illustrative embodiment in more detail. Reference numeral 11 denotes a charging pad. Pad 11 contains a charging coil 13 operating under direction of a controller 15. Pad 11 also contains secure element 17 which operates under the direction of controller 15. Secure element 17 is capable of securely transmitting data, illustratively utilizing RSA or elliptic curves, possibly followed by symmetric key cryptography, and providing verification/non-verification information to controller 15.

If communication with a receiver is to be accomplished via NFC or Bluetooth, a communications module or chip 23 connected to an antenna 21 is provided. Module or chip 23 may operate under direction of controller 15. If communication with the receiver is to be accomplished via modulation of the power carrier, module or chip 23 is not required.

Receiver 111 is equipped with coil 113 for receiving energy for the wireless charging of its battery (not shown). Receiver also contains a secure element 117 for providing encrypted information to pad 11 about the owner of the receiver, perhaps the party to be billed for the charging services, account information (balances, etc.), perhaps information regarding the standard according to which the receiver is to be charged, loyalty point or miles information, etc. Functioning of coil 113 and secure element 117 and communication module or chip 119 (discussed below) is controlled by controller 123 which may include a single chip or multiple chips.

If communication with the pad is to be accomplished via NFC or Bluetooth, a communication module or chip 119 is provided together with an antenna 121.

Prior to the beginning of wireless charging, and prior to transmission of data between the pad and the receiver, an authentication procedure over the communication channel is desirably performed. If authentication is successful, then secure communication via the respective secure elements may be set up. Encrypted tokens may be received, decrypted, and stored by either or both secure elements. Payment details can be established and then wireless charging can commence.

Figure 2:
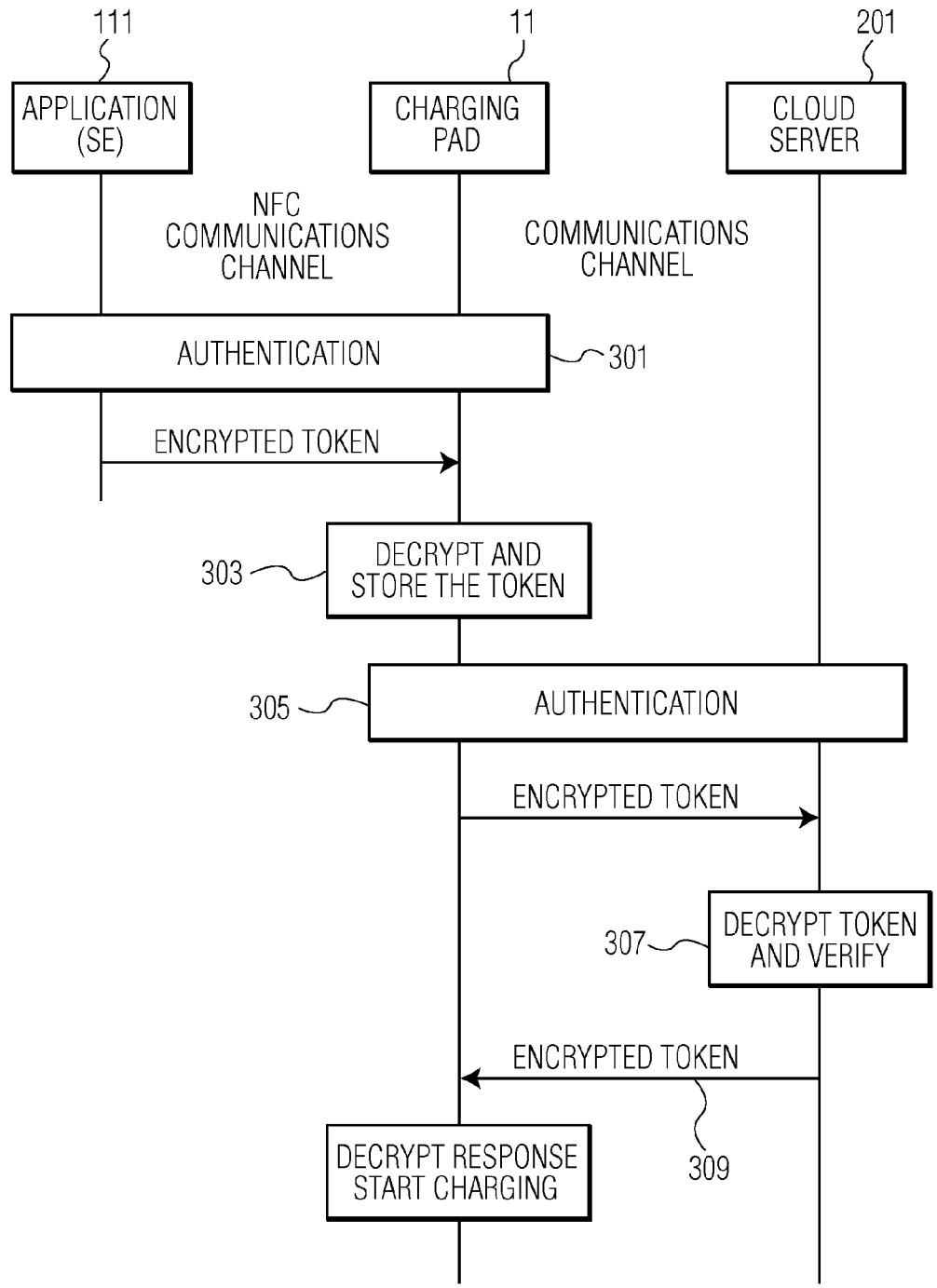
FIG. 2 is a chart showing another illustrative embodiment of the present invention.

FIG. 2 is a chart illustrative of a process that may be followed. Receiver 111 sends a message via a communication channel (which may be one of the channels described above, i.e. NFC, Bluetooth, or various forms of modulation transmitted utilizing energy harvested from an initial pulse provided by pad 11). Sending of this message via encrypted token is for the purpose of authentication and is denoted by reference numeral 301.

Pad 11 receives the encrypted token and decrypts it and may store the token as indicated in step 303. A further authentication takes place in step 305 in which pad 11 sends an encrypted token to a server 201 which may be a cloud server. The encrypted token sent in step 305 may be the same as the token sent in step 303 or may contain additional information regarding pad 11, such as its location, or other identifying information.

In step 307, server 201 decrypts the token transmitted in step 305 and verifies the identity of receiver 111 and may verify other information, such as accounts, availability of funds, points, or miles, or billing information, etc. When server 201 has determined by applying predetermined logic that the proposed charging procedure is appropriate and that the identity of receiver 111 is established, it sends an encrypted response in step 309 to pad 11. Then pad 11 decrypts the response and commences charging receiver 111.

In addition, once verification has been completed, if necessary, further secure communication via the same (or different) communication channels may be accomplished between receiver 111 and server 201 via pad 11.

In an alternative embodiment, receiver 111 may communicate directly with server 201 in a secure manner using NFC, or Bluetooth, or a variety of other communication modes, such as CDMA, GSM, etc. Receiver 111 may identify itself to a server 201 and provide information about its location utilizing an appropriate mode of GPS. Server 201 may perform any or all of the functions described above, such as verifying other information, such as accounts, availability of funds, points or miles, or billing information. Server 201 may determine the location of pad 11 by utilizing the GPS information provided by receiver 111 or by other means. Then server 201 may direct pad 11 to commence charging and may perform billing or deduction of points or miles, etc.

The direct connection between server and receiver will permit the receiver to get charging service rights or credits without going through the pad if the receiver is at the owner's home or another location far from the pad. Furthermore, if there is a connection failure between the pad and the server, a direct connection between the pad and receiver will facilitate authentication and communication prior to charging.

Thus, a variety of situations are envisioned. For example, if there is no connection between the server and both the charging pad and receiver, it is envisioned that credits, miles, or points that may be stored on the receiver may be utilized. If there is a connection between the server and the pad, but not to the receiver, the actions previously described may be performed. If there is a connection between the server and receiver, but not the pad, credibility may be checked via a 3G link. The charging signal may be provided by the server to the receiver which relays the charging signal to the pad. Finally, if there is a connection between the cloud server and both the pad and receiver, any of the method discussed above may be employed.

Various exemplary embodiments are described in reference to specific illustrative examples. The illustrative examples are selected to assist a person of ordinary skill in the art to form a clear understanding of, and to practice the various embodiments. However, the scope of systems, structures and devices that may be constructed to have one or more of the embodiments, and the scope of methods that may be implemented according to one or more of the embodiments, are in no way confined to the specific illustrative examples that have been presented. On the contrary, as will be readily recognized by persons of ordinary skill in the relevant arts based on this description, many other configurations, arrangements, and methods according to the various embodiments may be implemented.

The present invention has been described with respect to particular embodiments and with reference to certain drawings, but the invention is not limited thereto, but rather, is set forth only by the claims. The drawings described are only schematic and are non-limiting. In the drawings, for illustrative purposes, the size of various elements may be exaggerated and not drawn to a particular scale. It is intended that this invention encompasses inconsequential variations in the relevant tolerances and properties of components and modes of operation thereof. Imperfect practice of the invention is intended to be covered.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present invention, the only relevant components of the device are A and B.

What is claimed is:

1. A machine-implemented method of charging a receiver, the method comprising the steps of:
    harvesting power from an NFC signal by a receiver having a GPS device;
    utilizing the harvested power to power the receiver to perform an authentication procedure with a source of the NFC signal;
    transmitting a secure communication and GPS location data to a server via a mobile network for authentication by the server of information included in the secure communication; and
    in response to authentication of the information included in the secure communication, receiving charging from the source of the NFC signal.

2. The machine-implemented method of claim 1, wherein the secure communication is transmitted directly to a remote server that is distinct from the source of the NFC signal.

3. The machine-implemented method of claim 1, wherein the secure communication is transmitted directly to a charging pad.

4. The machine-implemented method of claim 1, wherein the information included in the secure communication comprises the identity of an owner of the receiver, characteristics of the receiver, and data related to payment.

5. The machine-implemented method of claim 4, wherein data related to payment comprises at least one of points, miles, and membership information.

6. The machine-implemented method of claim 1, wherein the authentication procedure comprises utilizing encrypted tokens to establish a secure communication channel between the receiver and the source of the NFC signal.

7. A machine-implemented method of charging a receiver, the method comprising the steps of:
    detecting a receiver having a GPS device using a charging pad;
    performing an authentication procedure between the receiver and the charging pad using the charging pad;
    transmitting a secure communication and GPS location data to a server for authentication by the server of information included in the secure communication;
    upon authentication of the information, charging the receiver.

8. The machine-implemented method of claim 7, wherein the information is authenticated by:
    transmitting the secure communication to a server for authentication; and
    receiving the results of the authentication from the server.

9. The machine-implemented method of claim 7, wherein the information included in the secure communication comprises the identity of an owner of the receiver, characteristics of the receiver, and data related to payment.

10. The machine-implemented method of claim 9, wherein data related to payment comprises at least one of points, miles, and membership information.

11. A receiver adapted to receive wireless charging, the receiver comprising:
    an NFC tag for harvesting power from an NFC signal;
    a secure element for establishing a secure communication channel using the harvested power;
    a transceiver for sending a secure communication to a server via a mobile network for authentication by the server;
    a GPS device for providing location information that is included in the secure communication; and
    a coil for receiving wireless charging energy in response to transmission of the secure communication.

* * * * *